April 22, 1969 | H. WEINSTEIN | 3,440,625

STRESS-WAVE THIN-FILM MEMORY

Filed May 5, 1965 | Sheet 1 of 2

INVENTOR.
HILLEL WEINSTEIN
BY
Carl V. Olson
Attorney

INVENTOR.
HILLEL WEINSTEIN
BY
Carl V. Olson
Attorney.

United States Patent Office 3,440,625

Patented Apr. 22, 1969

3,440,625

STRESS-WAVE THIN-FILM MEMORY

Hillel Weinstein, Kendall Park, N.J., assignor to Radio Corporation of America, a corporation of Delaware Filed May 5, 1965, Ser. No. 453,323

Int. Cl. G11b *5/00*

U.S. Cl. 340—174 2 Claims

ABSTRACT OF THE DISCLOSURE

A stress-wave memory in which a propagated stress wave causes rotation of magnetization in anisotropic thin magnetic film spots. An elongated quartz stress wave conductor has magnetic thin film spots on the top side and a write conductor on the bottom side. Propagated stress causes partial rotation of magnetization. Write current in "1" direction in write conductor causes additional rotation of magnetization to "1" direction. To read out information, a stress wave is propagated to cause momentary rotation of magnetization in magnetic spots, which induces sense signals in air-spaced sense conductors.

This invention relates to information storage systems, and more particularly to memories in which access to storage locations is accomplished by means of a stress wave propagated through magnetic memory elements.

It is a general object of this invention to provide a stress wave memory having improved operating characteristics, such as, lower necessary values of stress, avoidance of interaction between closely-spaced adjacent memory elements, and output sense signals of increased amplitude.

According to an example of the invention, there is provided an elongated sonic stress wave conductor made of a material such as fused quartz. Discrete anisotropic thin film magnetic spots, illustrated as circular spots, are deposited in a row on one side of the stress wave conductor. An electrical write conductor is located on the other side of the stress wave conductor and extends in a longitudinal direction. An electrical sense conductor extends near the magnetic spots in a transverse direction. A transducer is provided at one end of the stress wave conductor to generate a sonic stress wave pulse which propagates along the stress wave conductor to cause sequential momentary stressing of the magnetic spots in a direction causing rotation of the magnetic flux in each magnetic spot away from its easy axis direction. Write means synchronized with the time position of the stress wave pulse applies serial information bit electrical signals to the write conductor. A write current in one direction additionally rotates the flux to a total angle of more than 90 degrees. A write current in the opposite direction returns the flux toward its original easy axis direction. Read means is connected to the sense conductor to nondestructively sense flux changes due to the passage of a stress wave pulse along the stress wave conductor.

Figure 1:
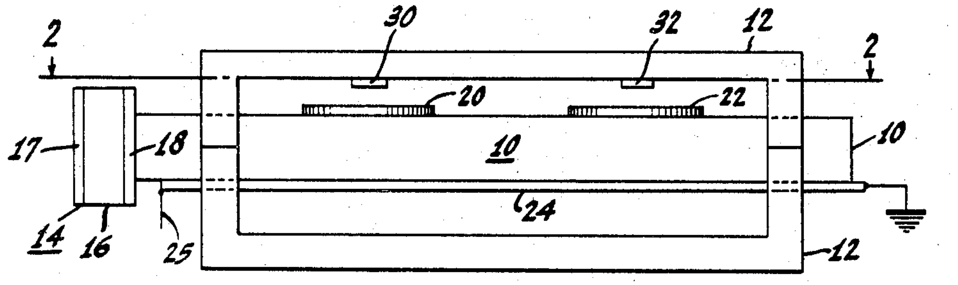
FIG. 1 is a side view of an illustrative two-bit memory constructed according to the teachings of the invention.
Figure 2:
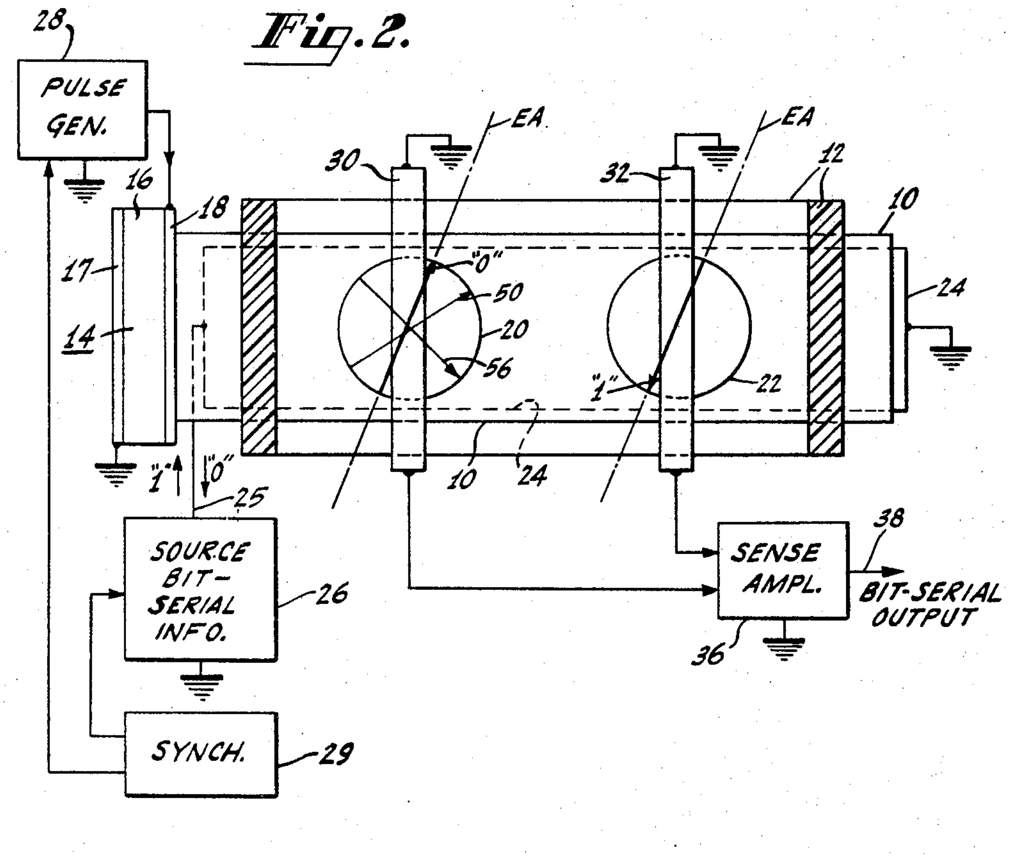
FIG. 2 is a sectional top view of the memory of FIG. 1 looking in the direction of the arrows 2—2.

Referring now in greater detail to FIGS. 1 and 2, there is shown a sonic stress wave conductor 10 of material such as fused quartz mounted in an insulating frame 12 constructed to support the stress wave conductor 10 in such a way as to prevent stress wave reflections from the right-hand end. The left-hand end of the sonic stress conductor

10 is mechanically coupled to an electromechanical transducer 14. The transducer 14 may, for example, be comprised of a piezoelectric crystal 16 sandwiched between electrical terminal plates 17 and 18, and may generate longitudinal-mode stress waves which then propagate along stress conductor 10. An electrical pulse applied across terminal plates 17 and 18 causes a stressing of the crystal 16 which results in a straining (mechanical movement) of the crystal. The stress and accompanying strain are transmitted to and propagated along the stress conductor 10. The term stress is used herein to describe both the stress and the accompanying strain.

The stress conductor 10 is preferably rectangular in cross section, and has a top flat planar surface on which anisotropic thin magnetic film memory elements or spots 20 and 22 are evaporated. The thin film magnetic spots 20 and 22 have a thickness of a few or several thousand angstroms (less than a micron), and may consist of magnetostrictive permalloy magnetic material. The thin magnetic spots 20 and 22 are evaporated, using conventional known techniques, so that each spot has an easy axis along a line EA. The easy axis EA is shown, by way of example, at an angle of about 75 degrees from the longitudinal direction of particle motion and propagation of stress in stress conductor 10.

The lower flat side of the sonic wave conductor 10 is provided with a longitudinally-extending electrical write conductor 24 connected at one end to a point of reference potential such as ground and connected at the other end through a conductor 25 to a source 26 of bit-serial digital information signals. Current pulses applied to write conductor 24 produce flux loops around the conductor which pass through magnetic spots 20 and 22. The current pulses are easily made large enough so that the conductor may be considered near the spots so far as electromagnetic effects are concerned. The source 26 supplies a current pulse in one direction to the conductor 25 to represent a "1" information bit, and supplies a current pulse in the opposite direction to represent a "0" information bit. An electrical pulse generator 28 has an output connected across the terminal plates of the transducer 14. The timing of the outputs of the source 26 and the pulse generator 28 are controlled by a synchronizing circuit 29.

Sense conductors 30 and 32 are supported by the insulating frame 12 and are arranged to pass near, but not in physical contact with, the respective thin film magnetic spots 20 and 22. The sense conductors 30 and 32 are in flux-linking, air-spaced relation with respective magnetic spots 20 and 22. The sense conductors 30 and 32 are each connected at one end to a point of reference potential such as ground and are connected at the other end to the input of a sense amplifier 36. The sense conductors 30 and 32 may be a single conductor and may be connected in any suitable way to the sense amplifier 36 so that electrical sense signals sequentially induced on conductor portions 30 and 32 will be supplied to the input of sense amplifier 36. The sense amplifier 36 has an output lead 38 for bit-serial output signals read from the memory.

Figure 3:
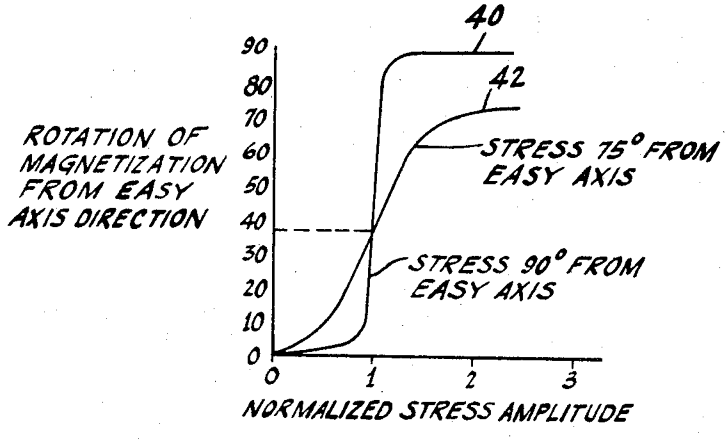
FIG. 3 is a chart which will be referred to in describing an underlying principle of the invention.

Reference is now made to the chart of FIG. 3 for a description of an underlying principle of the invention. The chart illustrates the increasing amount of angular rotation of magnetization in a thin magnetic film spot which results when the magnetic spot is subjected to an increasing physical stress. This principle is in contrast with prior art sonic stress memories in which the stress wave is used to change the coercive force of the memory element. In the absence of stress, the magnetization in a thin film spot has one or the other of two directions along the easy axis EA of the magnetic film spot. Curve 40 shows how the magnetization rotates from the easy axis direction in terms of the amplitude of stress applied to the magnetic spot when the stress is effective in a direction at right angles to the easy axis. Curve 42 shows the rotation of the flux from the easy axis direction when the stress is effective at an angle of about 75 degrees relative to the easy axis. The curves 40 and 42 are two examples of a family of curves obtained experimentally from a sample thin film element.

The effective directions of stress referred to, relative to the easy axis, are the directions of particle mechanical movement in the material, and are not necessarily the same as the direction of propagation of the sonic stress pulse wave. However, if the sonic pulse wave is propagated in the longitudinal mode, the direction of effective stress and strain is the same as the direction of propagation. This is the arrangement illustrated, by way of example, in the memory of FIGS. 1 and 2. The transducer 14 generates a longitudinal-mode sonic pulse wave which propagates longitudinally along the sonic wave conductor 10. The thin magnetic film spots 20 and 22 each have an easy axis EA at an angle of about 75 degrees from the longitudinal axis of the sonic conductor 10. The curve 42 in the chart of FIG. 3 therefore represents the angular rotation, due to stress, of the magnetization from the easy axis direction.

In the absence of stress, the arrow "0" in FIG. 2 along the easy axis EA represent flux storing a "0" information bit. If the spot 20 is subjected to a stress having an arbitrary one normalized unit of amplitude as represented in FIG. 3, the magnetization at direction "0" is rotated about 37 degrees to a direction 50. The stress always causes a clockwise rotation of the magnetization from the easy axis direction. The thin film magnetic spot 22 is shown with an arrow "1" lying along the easy axis EA in a direction representing the storage of a "1" information bit. When a stress pulse goes through the magnetic spot 22, it causes a 37 degree rotation of the magnetization "1" in the clockwise direction.

The angle between the easy axis EA and the effective direction of stress is selected to provide a desired threshold effect. The angle should be an angle more than 30 degrees and at least slightly less than 90 degrees. The angle should be such that the rotation of magnetization due to stress, plus the additive rotation of flux due to current in write conductor 24, exceeds 90 degrees. The rotation due to stress alone, or the rotation due to write current alone, must not cause a flux rotation of as much as 90 degrees.

Figure 4:
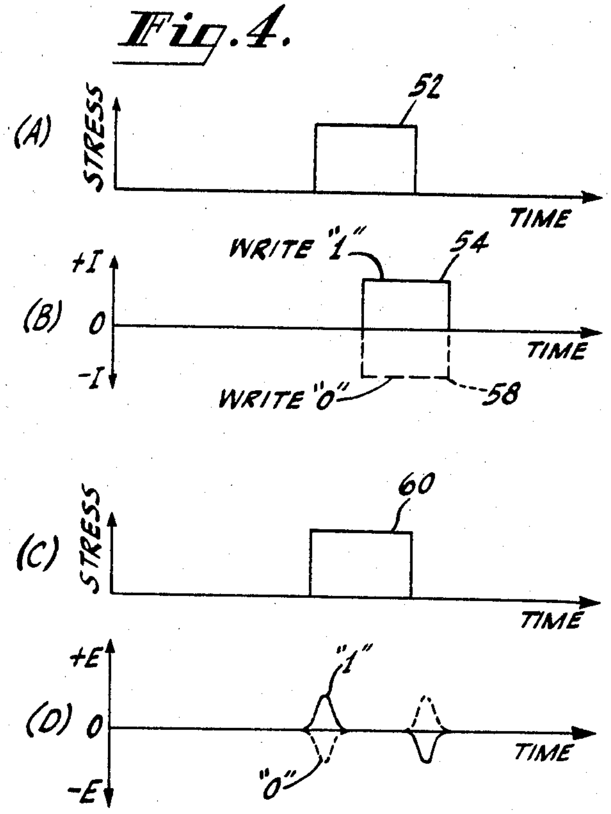
FIG. 4 is a series of waveforms which will be referred to in describing the operation of the invention.

The operation of the memory of FIGS. 1 and 2 will now be described with refernces to the waveforms of FIG. 4. The writing of information into the memory is accomplished by propagating a stress wave pulse along the stress wave conductor 10, and applying two information bit signals serially from source 26 to the write conductor 24 in time-position synchronism with the stress wave pulse as it passes through magnetic spots 20 and 22. The stress wave pulse is initiated by the transducer 14 in response to the application thereto of an electrical pulse from the electrical pulse generator 28. The stress pulse, represented as 52 in FIG. 4A, reaches and stresses the magnetic spot 20. The stress causes the direction of magnetic flux to rotate from the direction "0" to the direction 50. While the magnetic spot 20 is stressed, an electrical write pulse such as the "1" pulse 54 of FIG. 4B is supplied to electrical conductor 24 from information source 26. The electrical current pulse 54 is in a direction which produces a magnetic field having a direction (according to the right-hand current-flux rule), that additionally rotates the magnetization in the spot 20 from the direction 50 to the direction 56. The current pulse 54 is timed to be effective on the magnetic spot 20 during and for a short time following the passage through the magnetic spot of the stress pulse.

At the termination of the current pulse 54, the magnetization in the spot 20 relaxes to the closest direction lying along the easy axis EA. Since the direction 56 is more than 90 degrees removed from the direction "0," the flux relaxes to the direction opposite from the direction "0" to represent the storage of a "1" information bit in the magnetic spot 20. On the other hand, if it had been intended to store a "0" in the magnetic spot 20, a negative-polarity current pulse would have been supplied to the electrical conductor 20 from the information source 26. The negative current pulse 58 in FIG. 4B would have caused the magnetization to rotate from the direction 50 back toward the direction "0."

The stress wave then continues down the stress conductor 10 to the magnetic spot 22. The magnetic spot 22 is shown as having the magnetization oriented along the easy axis EA in the direction "1" to represent the storage of a "1" information bit. The stress pulse causes the magnetization in spot 22 to be rotated 37 degrees in the clockwise direction. Thereafter, information source 26 supplies a current pulse to electrical conductor 24 having one direction or the other depending on whether it is desired to write a "1" or a "0." After the termination of the current pulse, the magnetization in the magnetic spot 22 relaxes to the appropriate one of the two directions along the easy axis EA.

The time spacing of successive information bit pulses from the source 26 is made equal to the time it takes the sonic stress wave to propagate the distance between the centers of magnetic spots 20 and 22. The synchronizing circuit 29 controls the information source 26 and the pulse generator 28 so that the first information current pulse appears on the electrical conductor 24 slightly after the stress pulse reaches the first magnetic spot 20.

When it is desired to read out the information stored in the magnetic spots 20 and 22, the transducer 14 is energized by the electrical pulse generator 28 to propagate a stress pulse along the stress conductor 10. When the stress pulse represented at 60 of FIG. 4C reaches the magnetic spot 20, the leading edge of the stress pulse causes a temporary rotation of the magnetization from its direction along the easy axis and then back to its same direction along the easy axis. This rotation of the magnetization in the magnetic spot 20 involves also a corresponding rotation of the flux return path in the air above the magnetic spot 20. The rotation of the return path flux cuts the sense conductor 30 and induces a sense voltage therein. Since the stress pulse always causes a clockwise rotation of the flux, the polarity of the voltage generated on the sense conductor 30 depends on the original direction along the easy axis of the flux in the spot 20. The voltage induced on the sense conductor 30 as shown in FIG. 4D, has the polarity "1" or the polarity "0" depending on the information stored. The sense voltage pulse is applied from sense conductor 30 to the sense amplifier 36 which may be strobed at this time to provide an output at 38 of the "1" or "0" information bit. The trailing edge of the stress wave 60 also causes a momentary rotation of flux and corresponding sense voltages, which may be ignored. The stress pulse then continues down the stress conductor 10 to the magnetic spot 22 to cause the inducing of a sense signal on the sense conductor 32. This sense signal is similarly applied to the sense amplifier 36 and similarly results in an output information bit signal on output line 38. The bit serial output information bits on output 38 are spaced in time an amount determined by the speed of propagation of the stress pulse through the stress conductor 10 (about 20,000 feet per second) and the physical spacing of the magnetic spots 20 and 22.

The rotation of return path flux due to the passage of a reading stress pulse also induces a sense signal in the write conductor 24. Therefore, the sense conductors 30 and 32 may, in some applications, be omitted. In this case, the sense amplifier 36 is connected instead to the write conductor 24. However, more complex electronics is needed when both the source 26 and the sense amplifier are connected to one conductor. The use of separate write and sense conductors, as illustrated, is preferred.

It will be understood that while only two magnetic spots are shown for the storage of two information bits, that normally a large number of storage elements will be arranged in a row along the sonic conductor 10. It will also be understood that a memory utilizing the invention will normally consist of a large number of stress conductors 10 and means for selectively utilizing any one or all of the stress conductors at the same time according to known arrangements of sonic stress wave memory arrays.

What is claimed is:

1. A memory comprising an elongated sonic stress wave conductor, a row of anisotropic thin film magnetic spots deposited on one side of said sonic stress wave conductor, an electrical write conductor passing in flux-linking proximity with all of said magnetic spots, an electrical sense conductor passing in flux-linking proximity with each of said magnetic spots in a direction transverse to said write conductor, means to propagate a sonic stress wave pulse along said elongated stress wave conductor to cause sequential momentary stressing of said magnetic spots in a direction causing rotation of the magnetization in each magnetic spot away from its easy axis direction, write means synchronized with the time-position of said stress wave pulse to apply serial information bit signals to said write conductor in a direction to additionally rotate the magnetization a total angle of more than 90 degrees, or in a direction to return the magnetization toward its original easy axis direction, whereby the magnetization in each magnetic spot relaxes to a "1" direction along the easy axis or an opposite "0" direction along the easy axis, and read means connected to said sense conductor to sense flux changes due to the passage of a stress wave pulse along said elongated stress wave conductor.

2. A memory comprising an elongated sonic stress wave conductor, a row of discrete anisotropic thin film magnetic spots deposited on one side of said sonic stress wave conductor, an electrical write conductor extending in the direction of said elongated stress wave conductor on the other side thereof, an electrical sense conductor extending in flux-linking, air-spaced proximity with each of said magnetic spots in a direction transverse to said elongated stress wave conductor, means to propagate a sonic stress wave pulse along said elongated stress wave conductor to cause sequential momentary stressing of said magnetic spots in a direction causing rotation of the magnetization in each magnetic spot away from its easy axis direction, write means synchronized with the time-position of said stress wave pulse to apply serial information bit signals to said write conductor in a direction to additionally rotate the magnetization a total angle of more than 90 degrees, or in a direction to return the magnetization toward its original easy axis direction, whereby the magnetization in each magnetic spot relaxes to a "1" direction along the easy axis or an opposite "0" direction along the easy axis, and read means connected to said sense conductor to non-destructively sense flux changes due to the passage of a stress wave pulse along said elongated stress wave conductor.

References Cited

UNITED STATES PATENTS 3,129,412 4/1964 Lovell ------------- 340—174

STANLEY M. URYNOWICZ, Jr., *Primary Examiner.*